United States Patent
Edara et al.

(10) Patent No.: US 9,125,146 B1
(45) Date of Patent: Sep. 1, 2015

(54) BAND SCAN OPTIMIZATION FOR AN ELECTRONIC DEVICE

(71) Applicant: Amazon Technologies, Inc., Reno, NV (US)

(72) Inventors: Kiran Kumar Edara, Cupertino, CA (US); Pratima Vallurupalli, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 126 days.

(21) Appl. No.: 13/859,647

(22) Filed: Apr. 9, 2013

(51) Int. Cl.
*H04W 4/00* (2009.01)
*H04W 48/18* (2009.01)

(52) U.S. Cl.
CPC .................................... *H04W 48/18* (2013.01)

(58) Field of Classification Search
USPC ................ 455/432.1, 433, 434, 435.2, 456.1
See application file for complete search history.

(56) References Cited

U.S. PATENT DOCUMENTS

| | | | | |
|---|---|---|---|---|
| 8,036,654 B2 * | 10/2011 | Hind et al. | ................. | 455/432.1 |
| 2011/0039559 A1 * | 2/2011 | Yi et al. | ..................... | 455/435.2 |
| 2012/0115478 A1 * | 5/2012 | Gunaratnam et al. | ..... | 455/435.2 |
| 2013/0007039 A1 * | 1/2013 | Edara | ........................... | 707/769 |

* cited by examiner

*Primary Examiner* — Temica M Beamer
(74) *Attorney, Agent, or Firm* — Novak Druce Connolly Bove + Quigg LLP (57) ABSTRACT

Approaches enable a service such a network optimization service of a computing device (e.g., a mobile phone, table computer, etc.) or other electronic device to monitor certain conditions of the device, such as device location, to determine a region in which the device is operating in. The device location can be used to determine a region in which the device is operating, and based at least on that region, a group of frequencies (e.g., a band group) including at least a subset of band frequencies and technologies that the device supports can be determined. The device can then search bands/technologies from the band group to determine a network provider (e.g., a public land mobile network (PLMN)) from which to gain telecommunication service access.

24 Claims, 6 Drawing Sheets

BAND SCAN OPTIMIZATION FOR AN ELECTRONIC DEVICE

BACKGROUND

People are increasingly interacting with computers and other electronic devices in new and interesting ways. For example, mobile devices are increasingly supporting multiple wireless technologies (e.g., LTE, WCDMA, GSM, CDMA, etc.) and frequency bands. At power on, these devices attempt to select a network provider such as a public land mobile network (PLMN) from which to gain telecommunication service. There are at least two modes for the PLMN selection, including automatic and manual modes. When in automatic mode, the devices attempt to connect to a PLMN using a list of priority PLMNs in priority order, where the highest priority PLMN which is available and allowable is selected. When in manual mode, the devices indicate to a user which PLMNs are available. Often times, however, in scenarios such as when the device is out of coverage, first radio on, emergency camped, periodic home public land mobile network (HPLMN) search, manual network search, etc, these devices typically search all supported technologies and frequency bands when attempting to select a PLMN, which can cause battery drain and delays in acquiring service.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for network selection procedures for an electronic device. In particular, various embodiments enable a service such as a network optimization service of a computing device (e.g., a mobile phone, tablet computer, etc.) or other electronic device to optimize a network provider (e.g., a public land mobile network (PLMN) search) in a wireless communication system.

Various approaches discussed herein enable a network optimization service, or other such system or service, to monitor certain conditions of, or relating to, the device, such as device location, to determine a region in which the device is likely operating. Information such as the device location can be determined in a number of ways, such as by referencing a mobile country code (MCC) or other region code of a previous successful network provider (e.g., PLMN) registration, GPS information to determine a current device location, current connection information to a known wi-fi location, device sensor information (e.g., proximity sensor, gyroscope, etc.) to determine whether the device has moved since a previous successful network provider (e.g., a PLMN) registration or wireless connection, among others. The device location can be used to determine and/or estimate a region in which the device is operating, and a group of frequencies (e.g., a frequency band group) can be determined based at least in part on the determined region. The frequency band group can include at least a subset of available frequency bands, which can be selected based at least in part on technologies that the device supports. The device can prioritize search on the frequency bands from the selected frequency band group to determine a network provider from which to gain telecommunication service. Accordingly, approaches in accordance with various embodiments minimize delay in acquiring service and improve battery life by reducing an amount of processing to acquire the desired frequency band. Various other applications, processes, and uses are presented below with respect to the various embodiments.

Figure 1:
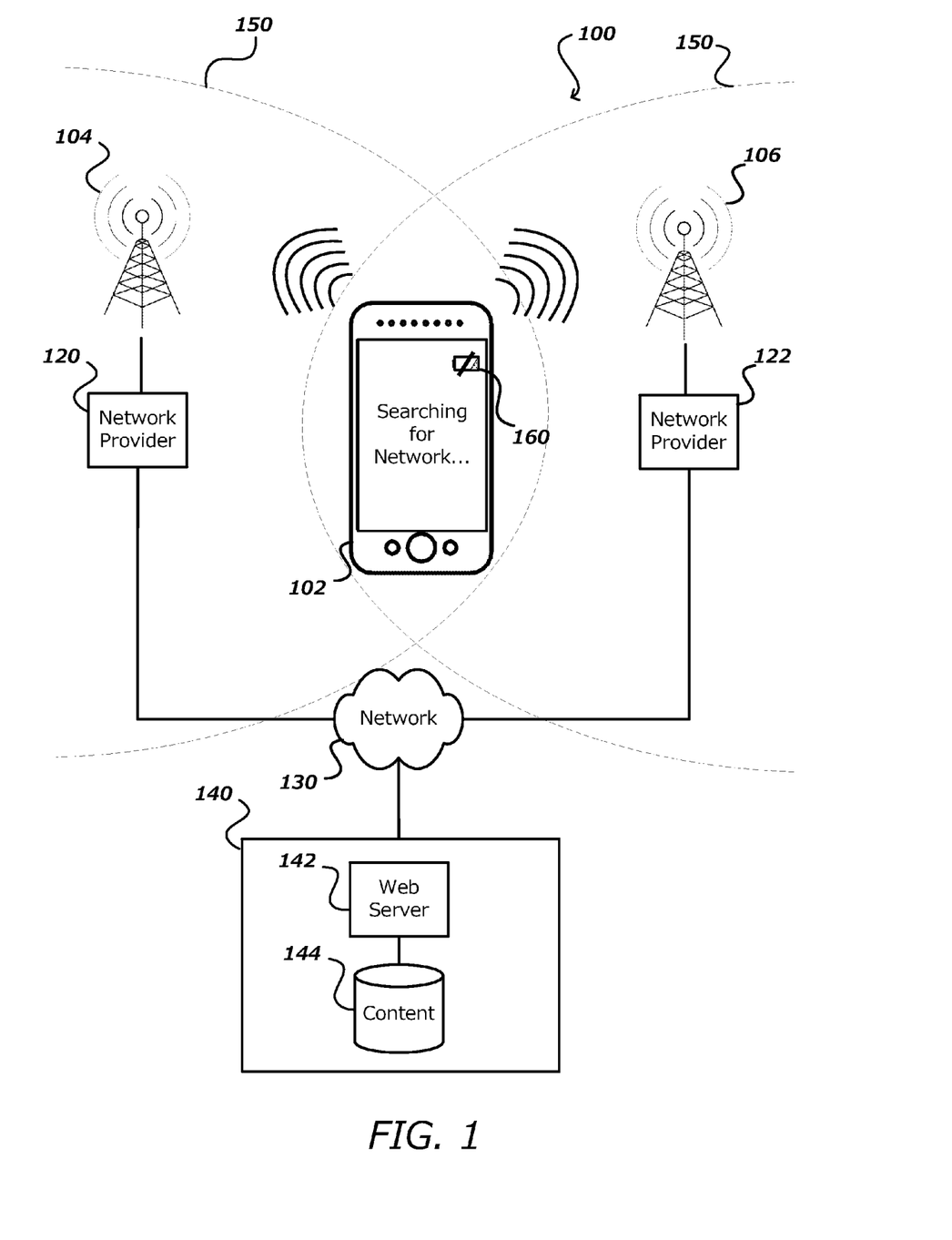
FIG. 1 illustrates an example of a device searching available frequency bands to determine which frequency bands are available when attempting to select a network provider in accordance with various embodiments.

FIG. 1 illustrates an example of a device 102 searching all available frequency bands to determine which frequency bands are available such as to connect to at least one public land mobile network (PLMN). As illustrated in situation 100 in FIG. 1, a computing device 102 is attempting to make contact with a PLMN, or other such network, when network communications of the device are activated (e.g., when the device is powered on, device flight mode turned off, device coming back from a no service area, etc.). While the device in this example is a portable computing device, such as a smart phone, tablet computer, or personal data assistant, it should be understood that any appropriate computing or electronic device can take advantage of aspects of the various embodiments, as may include personal computers, set top boxes, smart televisions, video game systems, or any device capable of wireless data transmission.

A PLMN operator (120, 122) provides access to at least one network (e.g., a global system for mobile communication (GSM), a long term evolution (LTE), universal mobile telecommunications system (UMTS), among others) using one or more cellular access towers (104, 106) to which the device connects for access to telecommunication services (such as data and/or voice communications) provided by a networked environment 140. There can be multiple PLMNs in a country, where each of the PLMNs can be configured to provide access to a respective one or more networks. For example, as shown in FIG. 1, PLMNs 120 and 122 provide access to the networked environment over an appropriate network 130, where in this example, the environment includes a Web server 142 for receiving requests and serving content in response thereto, although for other networks, an alternative device serving a similar purpose could be used, as would be apparent to one of ordinary skill in the art. Access to the networked environment can allow a user to perform tasks such as obtaining data from an appropriate data store 144, performing data and/or voice communications, among others. The PLMN includes a mobile network code (MNC) and a mobile country code (MCC) or other region code. The device can identify a visited country and a network provider according to the MCC of the PLMN and the MNC of the PLMN respectively.

The device can support at least a subset of the radio access technologies (RATs) and frequency bands provided by a PLMN, such as UMTS, GPRS, GSM and LTE. In a conventional device, when network communications of the device are activated, the device attempts to connect to a PLMN by searching for a cell tower of the PLMN. When attempting to connect to the PLMN, the device operates in at least one of an automatic mode or a manual mode to perform a PLMN selection. When in manual mode, the device indicates to a user which PLMNs are available. When in automatic mode, the device attempts to connect to a PLMN using a list of priority PLMNs in priority order, where the highest priority PLMN which is available and allowable is selected. For example, the device can first search a last registered public land mobile network (RPLMN). If the RPLMN/HPLMN is not found, the device can scan all frequency bands/RATs to find an available network. This can include, for example, attempting acquisition for full service and then limited service on a GWL acquisition list until a connection is established. Other available networks can include a home PLMN (HPLMN), which is a PLMN where the MCC and MNC of the PLMN match the MCC and MNC of the international mobile subscriber identify (IMSI) in subscriber identity module (SIM) of the device, a PPLMN, which is a PLMN stored in a PLMN selector (i.e., user controlled PLMN selector with access technology or operator controlled PLMN selector with access technology data field in the SIM of the device), a PLMN with a received signal level above a predetermined threshold, other PLMNs in descending order of signal quality, among others.

Often times, however, in scenarios such as when the device is out of network coverage, in between network coverage areas, or has weak network coverage (such as when the device is between the cellular range 150 of available cellular towers), first radio on, emergency camped, periodic Home Public Land Mobile Network (HPLMN) search, manual network search, etc., the device typically searches all supported RATs and frequency bands when attempting to select a PLMN, which can cause battery drain and delays in acquiring service. Further, the impact to battery life and delays in acquiring service can be increased for a PLMN search during international roaming (e.g., the device is in a location that is different from the home location, and thereby the home network (i.e., HPLMN) is different). In this situation, when network communications of the device are activated, the device first searches for RPLMN/HPLMN in the available RATs/frequency bands. If none of them are found, the device searches all supported RATs/frequency bands for available networks and shall prioritize amongst them. However, such an unguided search can be processor intensive and can drain the device's battery, and further can delay acquiring service. In some situations, such as situation 100 in FIG. 1, such network use can cause the device to power off due to insufficient battery life, while in other instances, the network use can drain the battery such that the device operates in a low power mode, where processing power is decreased to conserve battery life. For example, as shown in FIG. 1, at least partially due to continuous unguided searching for an available PLMN, the battery level 160 of the device is in a critical condition such that the device may power off. Accordingly, in accordance with various embodiments, approaches enable a service such a network optimization service of a computing device to monitor certain conditions of the device, such as device location, to determine a region in which the device is operating in. The device location can be used to determine a region in which the device is operating, and based at least on that region, a group of frequencies (e.g., a band group) including at least a subset of band frequencies and RATs that the device supports can be determined. The device can then prioritize searching bands/RATs from the derived/preferred band group to determine a network provider (e.g., a public land mobile network (PLMN)) from which to gain telecommunication service access.

Figure 2:
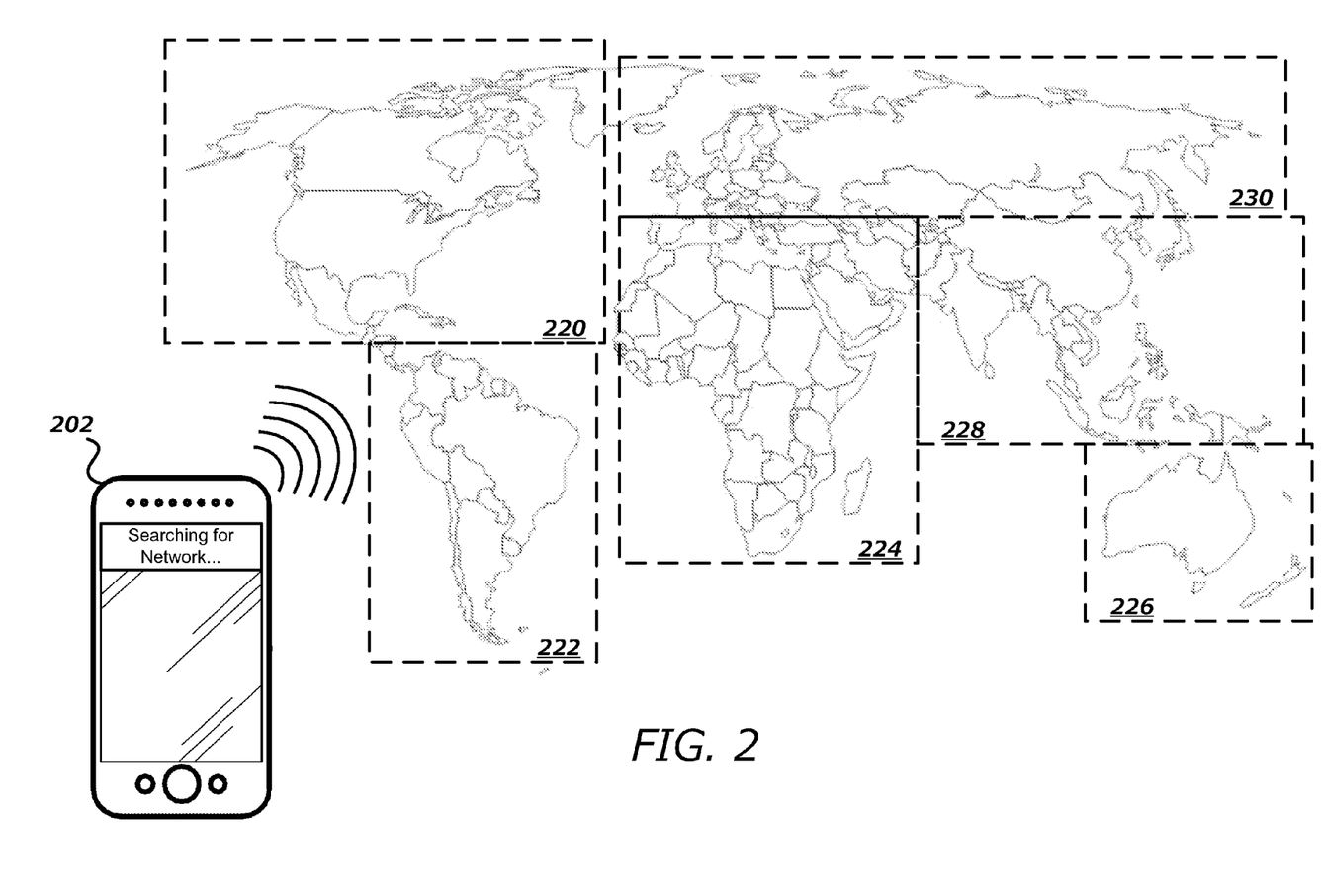
FIG. 2 illustrates an example network provider selection procedure in accordance with an embodiment.

FIG. 2 illustrates an example network provider (e.g., PLMN) selection procedure in accordance with an embodiment. As shown in FIG. 2, a computing device 202 (e.g., a mobile phone, tablet computer, etc.) is attempting to make contact with a network provider (e.g., a PLMN) in at least one of a plurality of different geographic regions (220, 222, 224, 226, 228, 230) when network communications of the device are activated (e.g., when the device is powered on, device flight mode turned off, device coming back from a no service area, etc.), where each of those regions might have different available RATs and/or utilized frequency bands. The device in this example includes at least a processor, a data store, and communication interface. The data store can include any data storage device that can store data for access by the processor, such as non-volatile memory, a subscriber identity module (SIM), flash memory, among others. The communication interface can include a radio transceiver and can exchange wireless signals with a network according to processing results of the processor.

As described, in a conventional mobile device, the device typically searches all supported RATs and frequency bands when attempting to select a network provider (e.g., a PLMN). Such an approach, however, increases CPU cycles and battery consumption. Accordingly, in accordance with various embodiments, the network optimization service can minimize delay in acquiring service and improve battery life by searching a subset of available RATs and frequency bands and excluding others for at least a period of time. For example, the device can maintain a database of which RATs and frequency band groups are supported in specific countries. For example, there can be a first frequency band group for United States MCC, a second frequency band group for Europe MCC's, a third frequency band group for Japan MCC, etc. Accordingly, based on the region, the MCC code can be determined and the MCC code can be used to determine available frequency bands/RATs for the region (preferred band group). The device can use the database to derive a preferred band group and also can dynamically determine the sequence of searching the different band groups in the database based at least in part on rules or other criteria. Dynamically determining the sequence of searching the different band groups based at least in part on rules or other criteria can include, for example, determining and/or estimating a region in which the device may be operating based on travel data. For example, travel data can be collected for a plurality of user's, such as travel data indicating a most likely arriving destination based on a departing destination, and the data can be used to predict a preferred frequency band group. Other rules or criteria can include user provided preferences or information, such as likely travel destinations, preferred home location, among others. Based at least in part on the rules, a preferred band group and the sequence of searching different band groups in the database can be determined. For example, frequencies associated with the preferred home location can be searched, and frequencies associated with likely travel destinations can be searched next if a network is not found within the frequencies associated with the preferred home location.

The database can be updated periodically, such as by an over the air (OTA) update, or an update provided by some other means (e.g., through a cable connected to a device configured to update the device), to modify the RATs and frequency band groups supported by each country, such as by adding, removing, or arranging the RATs and frequency band groups.

When network communications of the device are activated, the network optimization service or other service can determine a region in which the device is, or was last determined to be, operating. Information such as the device location can be determined in a number of ways, such as by referencing a MCC of a previous successful network provider (e.g., PLMN) registration, GPS information to determine a current device location, current connection information to a known wi-fi location, device sensor information (e.g., proximity sensor, gyroscope, etc.) to determine whether the device has moved since a previous successful network provider (e.g., PLMN) registration or wireless connection, among others. The device location can be used to determine and/or estimate a region in which the device is operating, and a derived/preferred group of frequencies (e.g., a frequency band group) and RATs can be determined based at least in part on the determined region. The derived/preferred frequency band group can include at least a subset of available frequency bands, which can be selected based at least in part on RATs that the device supports. The device can then search a range of frequencies based on the RATs (e.g., LTE, UMTS, GSM) supported by the device from the derived/preferred frequency band group to determine a network provider (e.g., PLMN) from which to gain telecommunication service. If the device does not connect to a network provider (e.g., PLMN) based on the search, the service can search a different group of frequency bands.

For example, when network communications of the device are activated, if the network optimization service determines that the last registered network provider (e.g., PLMN) is available, the service can select a preferred frequency band group based on the MCC of the last registered network provider (e.g., PLMN). The last registered network provider (e.g., PLMN) can be stored and accessed from non-volatile memory of the device and can be updated each time the device connects to a different network provider (e.g., PLMN). The frequency band groups not selected can be grouped into alternate frequency band groups. The service can scan the frequencies in the selected derived/preferred frequency band group based on one or more RATs supported by the device for at least a predetermined period of time. If the service does not determine a network provider (e.g., PLMN) which to connect, the service can scan the frequencies the alternate frequency band groups. If the service does not determine a network provider (e.g., PLMN) which to connect, the service can alternate between the frequencies in the selected derived/preferred frequency band group and the alternate frequency band groups at a predetermined interval.

If the last registered network provider (e.g., PLMN) is not available, the service determines whether the device was camped on a network provider (e.g., PLMN) at power off. Accordingly, in the instance the last registered network provider (e.g., PLMN) is not available, the service can service can use the MCC of the network provider (e.g., PLMN) on which the device was camped prior to power off. Thereafter, the service can select a frequency derived/preferred band group based on the MCC of the network provider (e.g., PLMN) to which the device was camped, and the frequency band groups not selected can be grouped into an alternate frequency band groups. The service then scans the frequencies in the selected derived/preferred frequency band group based on one or more RATs supported by the device for at least a predetermined period of time. If the service does not determine a network provider (e.g., PLMN) which to connect, the service can alternate between the frequencies in the selected derived/preferred frequency band group and the alternate frequency band groups at a predetermined interval.

In the instance the last registered network provider (e.g., PLMN) is not available and the device was not camped on a network at power off, a derived/preferred frequency band group can be selected based on the MCC of the device's SIM and the frequency band groups not selected can be grouped into an alternate frequency band groups. The service then scans the frequencies in the selected derived/preferred frequency band group based on one or more RATs supported by the device for at least a predetermined period of time. If the device does not find a network provider (e.g., PLMN) which to connect, the service scans the frequencies in the alternate frequency band groups for the predetermined period of time and alternates between the selected and alternate frequency band groups.

In some instances, when the last registered network provider is not available and the device was not camped on a network at power off, a derived/preferred frequency band group can be selected based on a detected presence of a network provider. For example, if a scan of available frequencies/RATs indicates a particular region (e.g., United States), subsequent scans can be based on the frequencies/RATs of the indicated region. If the device does not find a network provider which to connect based on the suspected region, the device scans frequencies/RATs in alternate frequency groups associated with a different region.

In accordance with an embodiment, once the service determines a network provider (e.g., PLMN) which to connect, the service locks the frequency band group based on which country the service determined the network provider (e.g., PLMN). In the instance the service cannot determine a frequency band group from the database based on current camped MCC, the locked frequency band group is configured to include all frequency bands that the device supports. In the situation where the device loses network coverage, the service scans the locked frequency band group (e.g., the frequency band group in which service was lost) for at least a predetermined of time. Additionally or alternatively, the service can scan the locked frequency band group and other frequency band groups in the database with intervals in between. Further still, in some situations it can be advantageous to select a frequency band group based at least in part on historical data. For example, data can be collected for a plurality of user's, such as travel data indicating a most likely arriving destination based on a departing destination, and the data can be used to predict a frequency band group for the arriving destination. The travel data can include a mapping from any departing destination, such as a city, state, country, etc., to a respective city, city, state, country, etc. For example, in some situations historical data may indicate that international traveling where the departing location is United States most likely has an arriving destination of Europe. As such, in the situation where frequency bands for United States have been searched, the next group of frequency bands searched can be European frequency bands.

Figure 3:
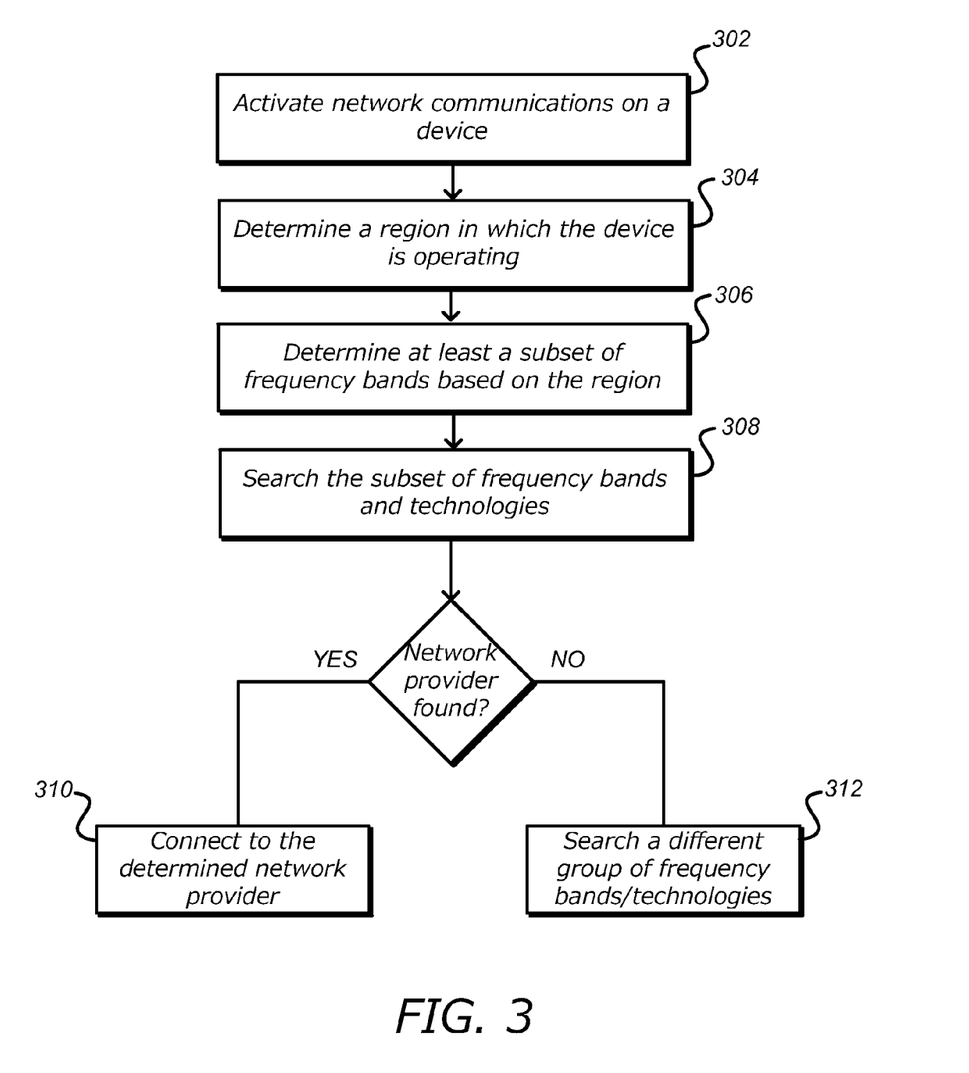
FIG. 3 illustrates an example process for selecting a network provider in accordance with various embodiments.

FIG. 3 illustrates an example process for selecting a network provider in accordance with various embodiments. It should be understood that, for any process discussed herein, there can be additional, fewer, or alternative steps performed in similar or alternative orders, or in parallel, within the scope of the various embodiments unless otherwise stated. In accordance with various embodiments, the device can be configured to determine a region code such as a mobile country code (MCC) for identifying a country when network communications of the device are activated and can prioritize search for available network providers (e.g., PLMNs), excluding at least a subset of available network providers (e.g., PLMNs).

For example, a network optimization service of a computing device (e.g., a mobile phone, tablet computer, etc.) can be provided to optimize network connection. For example, when network communications of the device are activated 302, the network optimization service or other service can determine 304 a region in which the device is, or was last determined to be, operating. Information such as the device location can be determined in a number of ways, such as by referencing a MCC of a previous successful network provider (e.g., PLMN) registration, GPS information to determine a current device location, current connection information to a known wi-fi location, device sensor information (e.g., proximity sensor, gyroscope, etc.) to determine whether the device has moved since a previous successful network provider (e.g., PLMN) registration or wireless connection, among others. The device location can be used to determine and/or estimate a region in which the device is operating, and a derived/preferred group of frequencies (e.g., a frequency band group) can be determined 306 based at least in part on the determined region. The derived/preferred frequency band group can include at least a subset of available frequency bands, which can be selected based at least in part on RATs that the device supports 306. The device can prioritize search 308 on the frequency bands and RATs from the selected frequency band group to determine a network provider (e.g., a PLMN) from which to gain telecommunication service. For example, a prioritized list of RATs configured to support a set of frequencies can be maintained for each of a plurality of region codes, wherein the set of frequencies for a particular RAT includes one or more frequency bands organized in a priority order. Based at least in part on a determined one of the plurality of region codes, one or more frequency bands can be scanned in the order listed in the priority order. If a network provider is determined, the device connects to the network provider to gain access to the telecommunication services. If a network provider is not found based at least in part on the search of the subset of available frequencies, the service can search 312 a different group of frequency bands. For example, the device can search a second set of frequencies at an expiration of a predetermined period of time of searching the selected frequency band for an available network provider, the second set of frequencies associated with a second geographic location. In some situations, the second geographic location can be determined based at least in part on an estimated location, the estimated location being based at least in part on travel data from a plurality of users.

Figure 4:
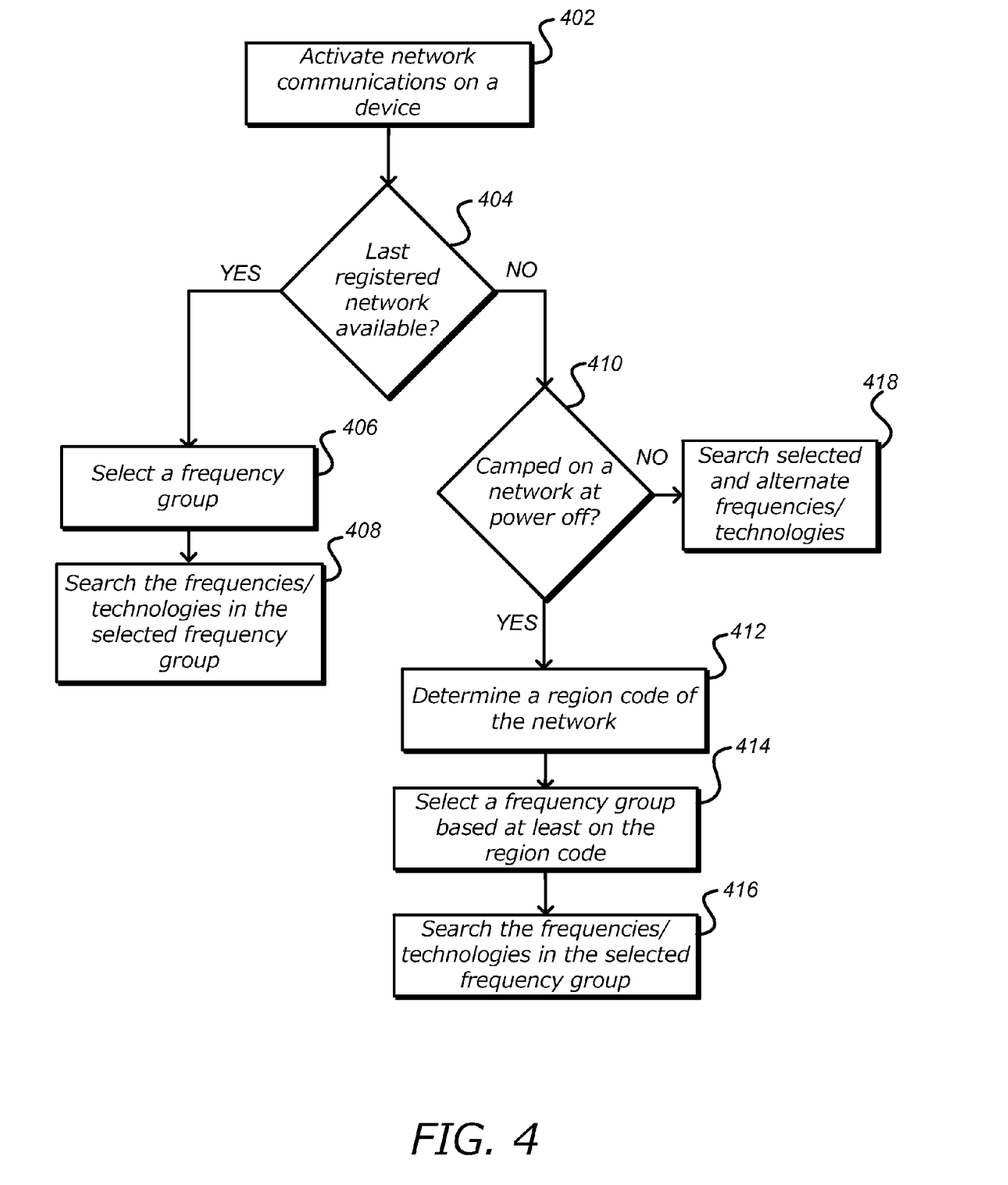
FIG. 4 illustrates an example process for selecting a network provider in accordance with an alternate embodiments.

FIG. 4 illustrates an example process for selecting a network provider in accordance with various alternate embodiments. As described, the device location can be used to determine a region in which the device is operating, and based at least on that region, a group of frequencies (e.g., a frequency band group) including at least a subset of frequency bands based at least on RATs that the device supports can be determined. For example, when network communications of the device are activated 402, if the network optimization service determines 404 that the last registered network provider (e.g., PLMN) is available, the service can select 406 a derived/preferred frequency band group from the database based on the MCC of the last registered network provider (e.g., PLMN). The last registered network provider (e.g., PLMN) can be stored and accessed from non-volatile memory of the device and can be updated each time the device connects to a different network provider (e.g., PLMN). The frequency band groups not selected can be grouped into alternate frequency band groups (e.g., defined in the database). The service can prioritize search 408 on the frequency bands and RATs in the selected derived/preferred frequency band group based on one or more RATs supported by the device for at least a predetermined period of time to determine a network provider (e.g., PLMN) from which to gain telecommunication service. If the service does not determine a network provider (e.g., PLMN) which to connect from the selected derived/preferred frequency band group, the service can scan the frequencies in the alternate frequency band groups. If the service does not determine a network provider (e.g., PLMN) which to connect, the service can alternate between the frequencies in the selected frequency band group and the alternate frequency band groups at a predetermined interval.

If the last registered network provider (e.g., PLMN) is not available, the service determines 410 whether the device was camped on a network provider (e.g., PLMN) at power off. In the instance the last registered network provider (e.g., PLMN) is not available, the service can determines 412 the MCC of the network provider (e.g., PLMN) on which the device was camped prior to power off to select a frequency band group to search. Thereafter, the service selects 414 a derived/preferred frequency band group based on the MCC of the network provider (e.g., PLMN) to which the device was camped, and the frequency band groups not selected can be grouped into an alternate frequency band groups. The service then searches 416 the frequencies in the selected derived/preferred frequency band group based on one or more RATs supported by the device for at least a predetermined period of time. In the service does not determine a network provider (e.g., PLMN) which to connect, the service can alternate 418 between the frequencies in the selected derived/preferred frequency band group and the alternate frequency band groups at a predetermined interval.

Figure 5:
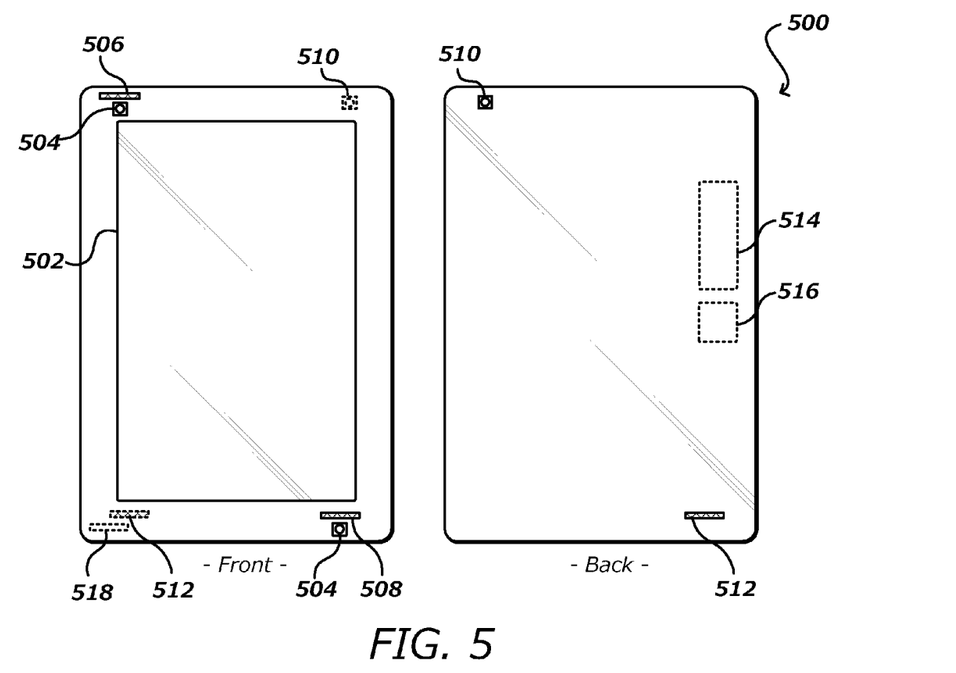
FIG. 5 illustrates front and back views of an example portable computing device that can be used in accordance with various embodiments.

FIG. 5 illustrates front and back views of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
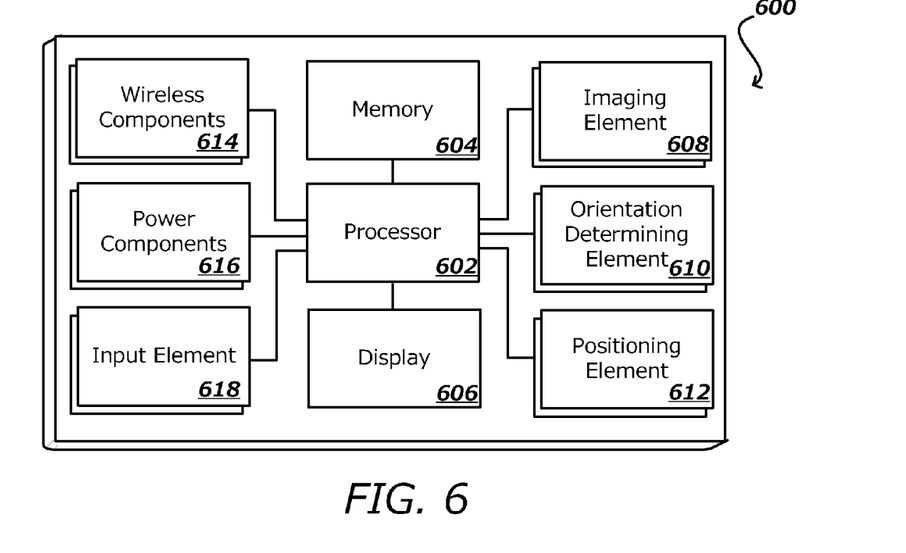
FIG. 6 illustrates an example set of basic components of a portable computing device, such as the device described with respect to FIG. 5.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
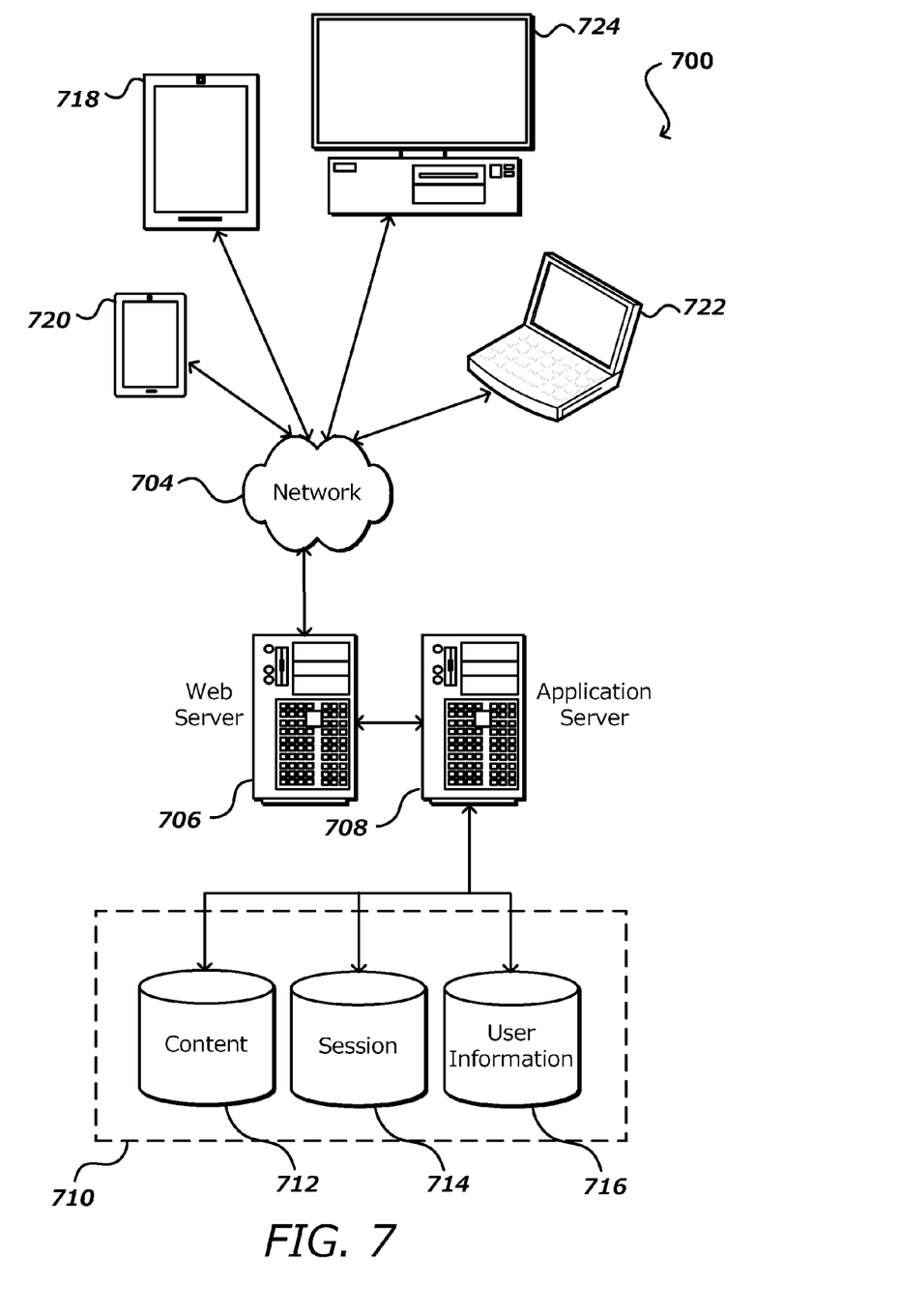
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes electronic client devices 718, 720, 722, and 724, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client devices 718, 720, 722, and 724 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 718, 720, 722 and 724. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for optimizing network connectivity in an electronic device, the method comprising:

determining a geographic location of a mobile computing device when network communications of the mobile computing device are activated, the mobile computing device configured to support one or more radio access technologies (RATs);

determining, based at least in part on the geographic location of the mobile computing device, a region code;

determining, based at least in part on the region code, one or more region RATs each configured to support a set of frequencies provided by one or more network providers associated with the region code;

determining that a first RAT of the one or more RATs matches a second RAT of the one or more region RATs;

identifying a first set of frequencies supported by the second RAT; and scanning, for at least a predetermined period of time, the first set of frequencies to locate an available network connection having at least a minimum signal strength, wherein the mobile computing device is configured to use the available network connection of one of the one or more network providers to perform network communications.

2. The computer implemented method of claim 1, further comprising:

scanning a second set of frequencies at an expiration of the predetermined period of time for an available network provider, the second set of frequencies associated with a second geographic location.

3. The computer implemented method of claim 1, wherein determining the geographic location of the mobile computing device includes determining at least one of a region code of a previous successful network provider registration, a location based on current GPS location information, connection information to a known wi-fi location, or computing device sensor information indicating an amount of movement of the mobile computing device from at least the previous successful network provider registration.

4. The computer implemented method of claim 1, further comprising:

maintaining, for each of a plurality of region codes, a prioritized list of RATs configured to support a set of frequencies, wherein the set of frequencies for a particular RAT includes one or more frequencies organized in a priority order; and scanning, based at least in part on a determined one of the plurality of region codes, one or more frequencies as prioritized based at least in part on the prioritized list of RATs.

5. A computer implemented method, comprising:
   determining a location of a computing device, the computing device configured to support a network access technology;
   determining one or more network access technologies available for the location;
   determining that a first network access technology of the one or more network access technologies matches a second network technology of the one or more network access technology available for the location;
   identifying a first set of frequencies supported by the second network technology; and
   scanning, starting with the first set of frequencies, for at least one available network connection supported by the computing device, wherein the computing device is configured to utilize the at least one available network connection to connect to a network associated with the first set of frequencies.

6. The computer implemented method of claim 5, further comprising:
   scanning a second set of frequencies upon scanning the set of frequencies for at least a predetermined period of time for at least one available network connection supported by the computing device, the second set of frequencies associated with a second location, wherein the second set of frequencies is selected based at least in part on an estimated location, the estimated location being based at least in part on travel data from a plurality of users.

7. The computer implemented method of claim 5, further comprising:
   maintaining, for each of a plurality of locations, a prioritized list of network access technologies, each of the network access technologies in the prioritized list of network access technologies being configured to support a set of frequencies, wherein the set of frequencies for a particular network access technology includes one or more frequencies organized in a priority order; and
   scanning, based at least in part on a determined one of the plurality of locations, one or more frequencies as prioritized based at least in part on the prioritized list of network access technologies.

8. The computer implemented method of claim 5, further comprising:
   in response to activating network communications of the computing device, determining a previously registered network provider; and
   scanning, starting with a set of frequencies associated with the previously registered network provider, for at least one available network connection supported by the computing device to connect to an associated network.

9. The computer implemented method of claim 5, further comprising:
   in response to activating network communications of the computing device, determining at least one network provider the computing device previously camped on; and
   scanning, starting with a set of frequencies associated with the at least one network provider the computing device previously camped on, for at least one available network connection supported by the computing device to connect to an associated network.

10. The computer implemented method of claim 5, further comprising:
    in response to activating network communications of the computing device, determining a set of frequencies associated with at least one network provider based at least in part on region information stored on a subscriber identity module (SIM) of the computing device; and
    scanning, starting with the set of frequencies, for at least one available network connection supported by the computing device to connect to an associated network.

11. The computer implemented method of claim 5, further comprising:
    determining, based at least in part on the location of the computing device, a region code, wherein determining the region code includes determining a mobile country code (MCC) from at least one network provider by reading system information broadcasted by a cellular tower of the at least one network provider; and
    determining at least a set of frequencies provided by at least one network provider based at least in part on the region code and the one or more network access technologies supported by the computing device.

12. The computer implemented method of claim 5, further comprising:
    in response to determining the at least one network connection, providing access to at least one resource provided by a network provider of the at least one available network connection;
    locking a frequency band group to which at least one network provider is associated with; and
    storing information indicating the locked frequency band group on the computing device.

13. The computer implemented method of claim 5, further comprising:
    determining one or more network access technologies supported by the computing device; and
    wherein scanning further includes scanning, starting with a set of frequencies associated with a network access technology determined to be supported by the computing device for the location.

14. The computer implemented method of claim 5, wherein activating network communications of the computing device includes at least one of powering up the computing device, turning a flight mode off on the computing device, or coming back from a no network service area.

15. A computing system, comprising:
    at least one processor;
    memory including instructions that, when executed by the at least one processor, cause the computing system to:
      determine a location of a computing device, the computing device configured to support a network access technology;
      determine one or more network access technologies available for the location;
      determine that a first network access technology of the one or more network access technologies matches a second network technology of the one or more network access technology available for the location;
      identify a first set of frequencies supported by the second network technology; and
      scan, starting with the first set of frequencies, for at least one available network connection supported by the computing device, wherein the computing device is configured to utilize the at least one available network connection to connect to a network associated with the first set of frequencies.

16. The computing system of claim 15, wherein the instructions, when executed, further cause the computing system to:

scan a second set of frequencies upon scanning the set of frequencies for at least a predetermined period of time for at least one available network connection supported by the computing device, the second set of frequencies associated with a second location, wherein the second set of frequencies is selected based at least in part on an estimated location, the estimated location being based at least in part on travel data from a plurality of users.

17. The computing system of claim 15, wherein the instructions, when executed, further cause the computing system to:
maintain, for each of a plurality of locations, a prioritized list of network access technologies, each of the network access technologies in the priorities list of network access technologies being configured to support a set of frequencies, wherein the set of frequencies for a particular network access technology includes one or more frequencies organized in a priority order; and
scan, based at least in part on a determined one of the plurality of locations, one or more frequencies as prioritized based at least in part on the prioritized list of network access technologies.

18. The computing system of claim 15, wherein the instructions, when executed, further cause the computing system to:
in response to activating network communications of the computing device, determine a previously registered network provider; and
scan, starting with a set of frequencies associated with the previously registered network provider, for at least one available network connection supported by the computing device to connect to an associated network.

19. The computing system of claim 15, wherein the instructions, when executed, further cause the computing system to:
in response to activating network communications of the computing device, determine at least one network provider the computing device previously camped on; and
scan, starting with a set of frequencies associated with the at least one network provider the computing device previously camped on, for at least one available network connection supported by the computing device to connect to an associated network.

20. The computing system of claim 15, wherein the instructions, when executed, further cause the computing system to:
in response to activating network communications of the computing device, determine a set of frequencies associated with at least one network provider based at least in part on region information stored on a subscriber identity module (SIM) of the computing device; and
scan, starting with the set of frequencies, for at least one available network connection supported by the computing device to connect to an associated network.

21. A non-transitory computer readable storage medium storing one or more sequences of instructions executable by one or more processors to perform a set of operations comprising:
determining a location of a computing device, the computing device configured to support a network access technology;
determining one or more network access technologies available for the location;
determining that a first network access technology of the one or more network access technologies matches a second network technology of the one or more network access technology available for the location;
identifying a first set of frequencies supported by the second network technology; and
scanning, starting with the first set of frequencies, for at least one available network connection supported by the computing device, wherein the computing device is configured to utilize the at least one available network connection to connect to a network associated with the first set of frequencies.

22. The non-transitory computer readable storage medium of claim 21, further comprising instructions executed by the one or more processors to perform a set of operations comprising:
determining, based at least in part on the location of the computing device, a region code, wherein determining the region code includes determining a mobile country code (MCC) from at least one network provider by reading system information broadcasted by a cellular tower of the at least one network provider; and
determining at least a set of frequencies provided by the at least one network provider based at least in part on the region code and the one or more network access technologies supported by the computing device.

23. The non-transitory computer readable storage medium of claim 21, further comprising instructions executed by the one or more processors to perform a set of operations comprising:
determining one or more network access technologies supported by the computing device; and
wherein scanning further includes scanning, starting with a set of frequencies associated with a network access technology determined to be supported by the computing device for the location.

24. The non-transitory computer readable storage medium of claim 21, further comprising instructions executed by the one or more processors to perform a set of operations comprising:
scanning a second set of frequencies upon scanning the set of frequencies for at least a predetermined period of time for at least one available network connection supported by the computing device, the second set of frequencies associated with a second location, wherein the second set of frequencies is selected based at least in part on an estimated location, the estimated location being based at least in part on travel data from a plurality of users.

* * * * *